(12) United States Patent
Papamichael et al.

(10) Patent No.: US 7,781,713 B2
(45) Date of Patent: Aug. 24, 2010

(54) METHOD FOR CALIBRATING A LIGHTING CONTROL SYSTEM THAT FACILITATES DAYLIGHT HARVESTING

(75) Inventors: Konstantinos Papamichael, El Macero, CA (US); Keith Graeber, Davis, CA (US); Erik Page, Winters, CA (US); Michael Siminovitch, Woodland, CA (US)

(73) Assignee: The Regents of the University of California, Oakland, CA (US)

( * ) Notice: Subject to any disclaimer, the term of this patent is extended or adjusted under 35 U.S.C. 154(b) by 325 days.

(21) Appl. No.: 11/703,936

(22) Filed: Feb. 8, 2007

(65) Prior Publication Data

US 2007/0185675 A1 Aug. 9, 2007

Related U.S. Application Data

(60) Provisional application No. 60/771,770, filed on Feb. 8, 2006.

(51) Int. Cl.
*G01J 1/32* (2006.01)
*H05B 37/02* (2006.01)

(52) U.S. Cl. .............................. 250/205; 250/214 AL; 315/149; 315/150; 315/151

(58) Field of Classification Search ................. 250/205, 250/214 AL; 315/149, 151, 152, 153
See application file for complete search history.

(56) References Cited

U.S. PATENT DOCUMENTS

| | | | | |
|---|---|---|---|---|
| 5,357,170 A | * | 10/1994 | Luchaco et al. | 315/159 |
| 5,648,656 A | * | 7/1997 | Begemann et al. | 250/214 AL |
| 5,701,058 A | * | 12/1997 | Roth | 315/158 |
| 6,025,679 A | * | 2/2000 | Harper et al. | 315/312 |
| 6,555,966 B2 | * | 4/2003 | Pitigoi-Aron | 315/158 |
| 6,624,597 B2 | * | 9/2003 | Dowling et al. | 315/291 |

(Continued)

OTHER PUBLICATIONS

LRC Press Release, Apr. 20, 2006, "Scientists Develop Simple Alternative for Harvesting Daylight and Saving Energy" [online, retrieved on Feb. 8, 2007 from http://www.Irc.rpi.edu/resources/newsroom/pr_story.asp?id=75].
Levitron MiniZ Daylighting Control [online, retrieved on Feb. 8, 2007 from http://www.leviton.com/OA_HTML/ibeCtpSctDspRte.jsp?section=15197].

(Continued)

*Primary Examiner*—Stephen Yam
(74) *Attorney, Agent, or Firm*—Park, Vaughan & Fleming LLP

(57) ABSTRACT

One embodiment of the present invention provides a system for calibrating a lighting control system. The lighting control system is a daylight-harvesting system that controls the output of the lighting system based on available daylight and/or other light sources to reduce energy usage while providing lighting for an area. The lighting system includes multi-level lighting capabilities for one or more light sources. First, the system measures the light levels for the area when the lighting system: is turned on at a high energy-level; is turned on at an intermediate energy-level; and is turned off. The system determines from these measured light levels the light output of the lighting system in the different states. Then, during operation, the system measures a present light level for the area. The system then adjusts the light output of the lighting system for the area based on a lighting control parameter (e.g an on set-point and an off set-point pair), the present light output of the lighting system, and the present light level for the area.

20 Claims, 8 Drawing Sheets
(7 of 8 Drawing Sheet(s) Filed in Color)

U.S. PATENT DOCUMENTS

| | | | |
|---|---|---|---|
| 7,045,968 B1 * | 5/2006 | Bierman et al. | 315/244 |
| 7,190,126 B1 * | 3/2007 | Paton | 315/308 |
| 7,202,613 B2 * | 4/2007 | Morgan et al. | 315/312 |
| 2006/0279225 A1 * | 12/2006 | Hick et al. | 315/152 |

OTHER PUBLICATIONS

WattStopper Lightsave LS-101 Daylighting Controller cutsheet [online, retrieved on Feb. 8, 2007 from http://www.wattstopper.com/products/details.html?id=180].

* cited by examiner

METHOD FOR CALIBRATING A LIGHTING CONTROL SYSTEM THAT FACILITATES DAYLIGHT HARVESTING

RELATED APPLICATION

This application claims priority under 35 U.S.C. section 119(e) to U.S. Provisional Application Ser. No. 60/771,770, entitled "Dual Photo-Sensor Dimming Daylight Controls," by inventors Konstantinos Papamichael and Keith Graeber, filed on 8 Feb. 2006, the contents of which are herein incorporated by reference.

BACKGROUND

1. Field of the Invention

The present invention relates to lighting systems. More specifically, the present invention relates to the process of automatically calibrating a lighting control system that facilitates daylight-harvesting.

2. Related Art

Most commercial spaces with windows receive enough daylight to at least partially reduce the need for electric lighting. Daylight-harvesting systems strive to reduce the amount of electric lighting used when there is sufficient daylight present. For instance, a daylight-harvesting system can dim or switch electric lights to complement the amount of available daylight. Reducing electric lighting based on the availability of daylight can provide significant energy savings and can reduce peak energy demand.

However, installing and maintaining daylight-harvesting systems can involve substantial expense and effort. For instance, daylight-harvesting systems can involve substantial "commissioning," i.e., adjusting for the local environment and verifying that the system is (and remains) calibrated and functional. For instance, the control system for a daylight-harvesting system may originally be calibrated by a human technician upon installation, but lose calibration over time due to changes in the area being illuminated and/or aging of the lighting system. Ongoing manual calibration can involve considerable expense, while an uncalibrated lighting system may operate improperly, and can potentially lead to user annoyance and system disablement, with a resulting loss of energy savings.

Hence, what is needed is a method and an apparatus for improving lighting control for daylight-harvesting systems.

SUMMARY

One embodiment of the present invention provides a system for calibrating a lighting control system. The lighting control system is a daylight-harvesting system that controls the output of the lighting system based on available daylight and/or other light sources to reduce energy usage while providing lighting for an area. The lighting system includes multi-level lighting capabilities for one or more light sources. First, the system measures the light levels for the area when the lighting system: is turned on at a high energy-level; is turned on at an intermediate energy-level; and is turned off. The system determines from these measured light levels the light output of the lighting system in the different states. Then, during operation, the system measures a present light level for the area. The system then adjusts the light output of the lighting system for the area based on one or more lighting control parameters (e.g. an on set-point and an off set-point), the present light output of the lighting system, and the present light level for the area.

In a variation on this embodiment, the lighting system includes one or more of: a light source; a photosensor; a controller, which can include both logic and switching functionality; a user control; and an occupancy sensor. The photosensor measures light levels for the area, and the controller adjusts the lighting system output through one or more steps from a high to a low state based on input from the photosensor. Note that the high state can be the 100% light output level, and the low state can be the 0% light output level.

In a variation on this embodiment, the system allows the lighting system to reach a steady state prior to measuring a given light level.

In a further variation, the system measures the difference between the output of the photosensor when the lighting system: is turned to a high energy-level, is turned to one or more intermediate energy-levels, and is turned off. The system then uses the differences between the measured light levels to determine the light output of the lighting system and to automatically calibrate the control of the light output of the lighting system without human intervention.

In a further variation, the system measures the light levels for the area frequently. For instance, the system can measure the difference in light levels whenever the light output of the lighting system is adjusted. Measuring the difference in light levels whenever the light output of the lighting system is adjusted allows the system to continuously calibrate, and thereby account for any changes in a light source and/or any changes in the reflectance of surfaces in the area.

In a further variation, the system adjusts a light level and/or lighting control parameter based on a user input received via a user control.

In a further variation, the system changes one or more lighting control parameters, such as either or both of an off set-point and an on set-point, for the lighting system based on user input. The off set-point indicates the light level at which the light output of the lighting system will be reduced, while the on set-point indicates the light level at which the light output of the lighting system will be increased. In a further variation, the minimum light level for the area (which may correspond to the on set-point) is related to the output of the lighting system at the high energy-level. In a further variation, the off set-point is also related to the output of the lighting system at the high energy-level.

In a further variation, the user control includes one or more of: a controller-mounted user control; a fixture-mounted user control; a wall-mounted user control; and a wireless remote.

In a further variation, the automatic calibration and operation of the lighting system can be overridden by an input from the user control.

In a variation on this embodiment, the system uses a ramping mechanism that gradually changes the light output of the lighting system to minimize the visual impact of the changes to the light output.

In a variation on this embodiment, the system includes a time delay when considering whether to change the light output of the lighting system, to ensure that changes in measured light levels are not due to transient effects.

In a further variation, the system uses the occupancy sensor to:
  turn off a lighting source when the area is not occupied;
  ensure that a lighting source is never turned off when the area is occupied;
  ensure that the light output of the lighting system is not reduced when the area is occupied;
  detect when the area is not occupied, so that that lighting system can calibrate when no occupants are present; and/or detect when the area is re-occupied, at which point the system can determine a level of light output based on the output of the photosensor and/or other factors.

In a further variation, one or more components of the lighting system are integrated into a lighting fixture.

In a variation on this embodiment, the lighting system is an on-off lighting system that includes multiple lighting sources that can be turned on and off independently to adjust light output and energy usage.

In a variation on this embodiment, the lighting system is a dimming lighting system. Note that in a dimming lighting system, one or more lighting sources can be adjusted to different light output levels in a synchronized manner. A dimming lighting system can involve stepped and/or continuous dimming.

In a further variation, the user can override the normal operation of the lighting control system using the user control. For instance, the user can override the control system and set the lighting system to output a high-energy-level light output and ignore the input to the photosensor and/or the occupancy sensor.

In a variation on this embodiment, the lighting system includes two or more light sources.

COLOR DRAWINGS

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Daylight Harvesting Using Switching

Daylight work-place illuminance measurements in north-facing office spaces demonstrate that switching and/or dimming lights can be very effective in reducing energy usage in areas next to windows. These techniques can provide adequate daylight even on foggy, overcast winter days. Switching involves turning on/off one or more light elements in a multi-level lighting system. In a lighting system with a single lighting element, the multi-level lighting system may include only two states, 'on' and 'off'. In a lighting system with two lighting elements, the multi-level lighting system may include an 'off' state, and three 'on' states, in which only the first lighting element is on, only the second lighting element is on, or both the first and the second lighting element are on (possibly resulting in two different intermediate light-output levels and a "high" light-output level). Increasing the number of individually-switchable lighting elements in the lighting system allows the output of the lighting system to achieve a wider range of light-output levels. Dimming, meanwhile, typically involves adjusting the output of one or more light sources (e.g., perhaps in a synchronized manner) using a dimming ballast. Note that multiple switching levels can be substantially similar to continuous dimming, but can sometimes involve a lower cost and/or lower energy usage, for instance due to simpler or cheaper components.

Figure 1A:
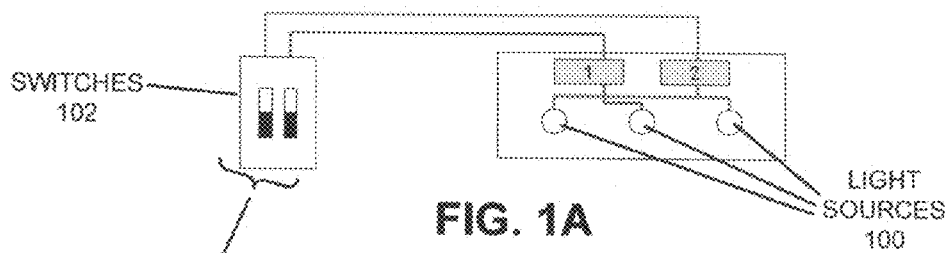
FIG. 1A illustrates a multi-level on-off lighting system in an off state in accordance with an embodiment of the present invention.
Figure 1B:
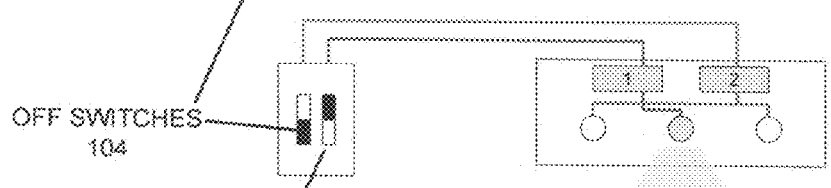
FIG. 1B illustrates a multi-level on-off lighting system in a low light-output state in accordance with an embodiment of the present invention.
Figure 1C:
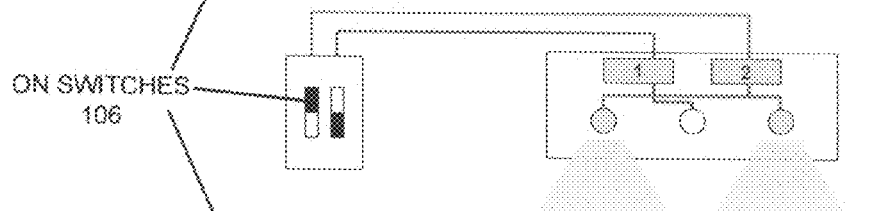
FIG. 1C illustrates a multi-level on-off lighting system in an intermediate light-output state in accordance with an embodiment of the present invention.
Figure 1D:
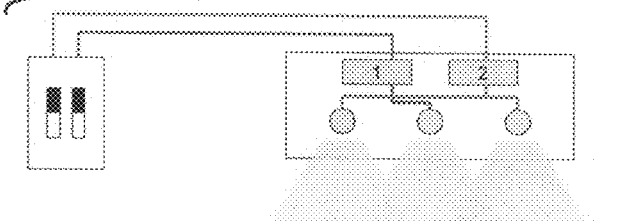
FIG. 1D illustrates a multi-level on-off lighting system in a high light-output state in accordance with an embodiment of the present invention.

FIGS. 1A-1D illustrate how two switches 102 can be used to change between the four states of a multi-level on-off lighting system with three light sources 100. In FIGS. 1A-1D, the three light sources are divided into two independent sets that can be turned on and off independently to adjust light output and energy usage. FIG. 1A illustrates the lighting system in an off state, with both switches 102 off 104. In FIG. 1B, a single light source ('1') is switched on 106, causing the lighting system to output a low level of light. In FIG. 1C, a second switch 100 that controls two light sources ('2') is switched on 106, causing the lighting system to output an intermediate level of light. In FIG. 1D, both switches 102 are on, turning on all three light sources 100 and causing the lighting system to output a maximum level of light.

Figure 2A:
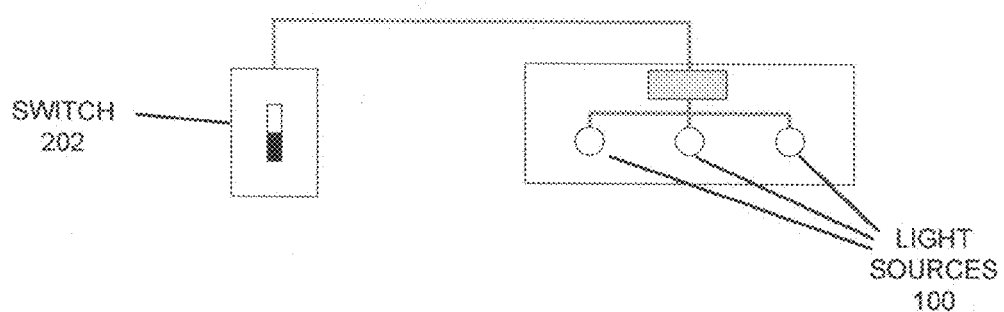
FIG. 2A illustrates a multi-level dimmed lighting system in an off state in accordance with an embodiment of the present invention.
Figure 2B:
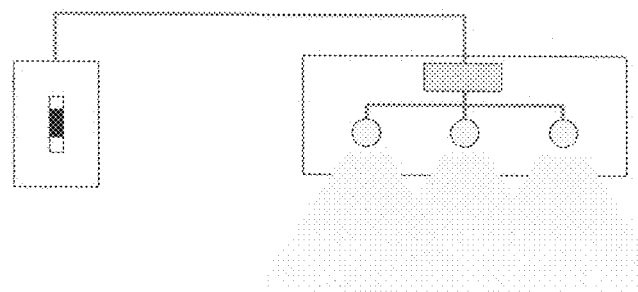
FIG. 2B illustrates a multi-level dimmed lighting system in an intermediate light-output state in accordance with an embodiment of the present invention.
Figure 2C:
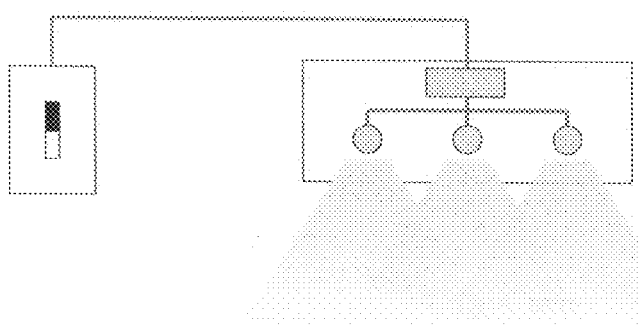
FIG. 2C illustrates a multi-level dimmed lighting system in a high light-output state in accordance with an embodiment of the present invention.

FIGS. 2A-2C illustrate how a multi-level switch 202 can be used to change between states in a multi-level dimming light system with three light sources 100. FIG. 2A illustrates the lighting system in an off state. In FIG. 2B, the light sources 100 are all set to emit a synchronized intermediate level of light. In FIG. 2C, the light sources 100 are all set to emit a synchronized high level of light.

Even recent daylight-harvesting systems typically require initial calibration by a human technician to establish a relationship between a photosensor signal and work-plane illuminance.

One embodiment of the present invention provides a simple, robust technique for automatically setting light sources to different light output states based on the signal from a control photosensor. This technique allows the control system to automatically calibrate, thereby allowing the control system to work "out of the box" without manual calibration. By eliminating manual calibration and commissioning, this technique eliminates the most expensive part of daylight-harvesting controls.

A Simplified Daylighting Harvesting System

In one embodiment of the present invention, a simplified daylight harvesting (SDH) system includes one or more of the following:
- a photosensor that views the illuminated area of interest;
- a microcontroller that controls the output of the lighting systems based on input from the photosensor;
- one or more light sources that can be switched with relay switches or set to different light output levels by the microcontroller;
- a user control; and
- an occupancy sensor.

Note that these components can be housed in a single unit, and the microcontroller may be integrated into another component. Alternatively, the components may be distributed and communicate wirelessly or using wires. Components of the SDH system can be mounted on ceilings, walls, light fixtures, and/or other surfaces. Photosensors and/or occupancy sensors which are part of the system will typically be positioned to sense an area illuminated by the light source(s).

Figure 3A:
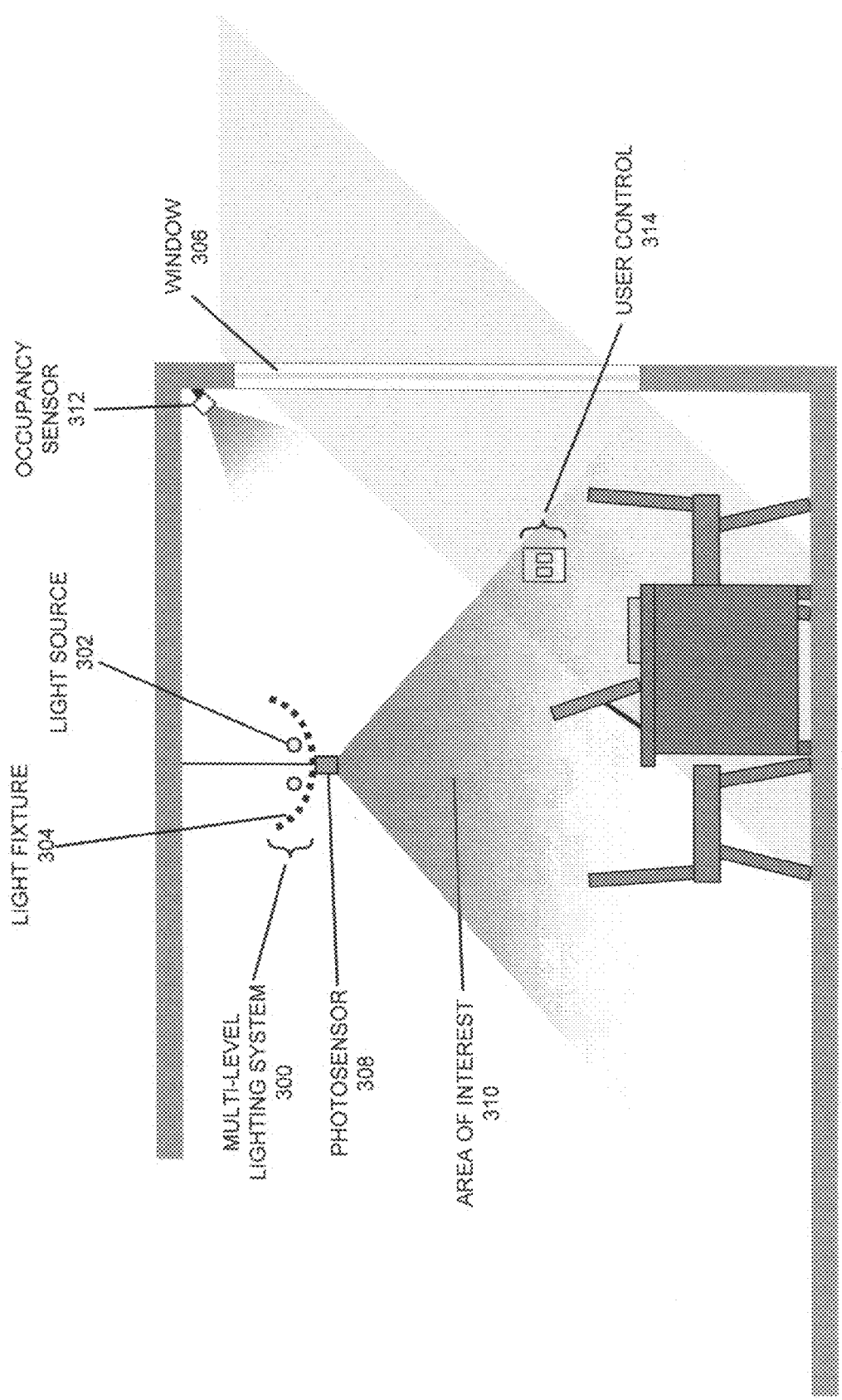
FIG. 3A illustrates an area illuminated by two lamp light sources controlled by a simple daylight harvesting (SDH) control system in accordance with an embodiment of the present invention.

FIG. 3A illustrates an area illuminated by a SDH system. A multi-level lighting system 300 includes one or more light sources 302 in one or more light fixtures 304. The light output of the light fixture(s) 304 is complemented by daylight and/or other lighting sources, such as sunlight entering the area via a window 306, a skylight, a direct-beam daylighting system, or other sources of light. A microcontroller (not shown) may adjust the light output to different light levels to achieve a level of light in a given area.

A photosensor 308 is configured to measure the light levels in an area of interest 310 that can correlate to the area illuminated by the light fixture(s) 304. Note that the angular response of the photosensor can be configured to correlate to the candlepower distribution of the lighting fixture. The SDH system can also include an occupancy sensor 312 and user control 314, such as a controller-mounted user control, a fixture-mounted user control, a wall-mounted user control, and/or a wireless remote control.

Figure 3B:
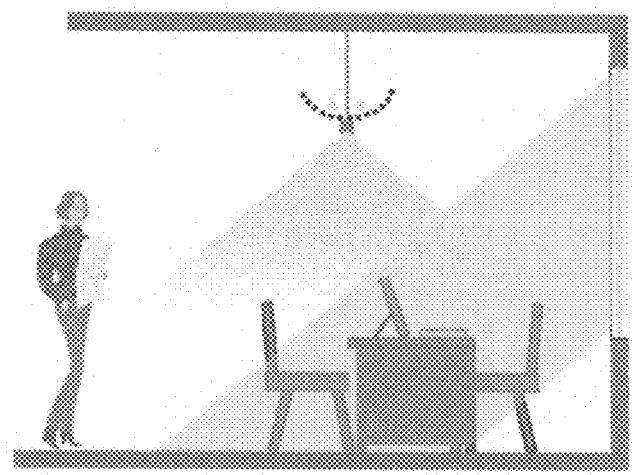
FIG. 3B illustrates the area shown in FIG. 3A when the two lamp light sources controlled by the SDH control system are turned off due to the presence of strong daylight in accordance with an embodiment of the present invention.
Figure 3C:
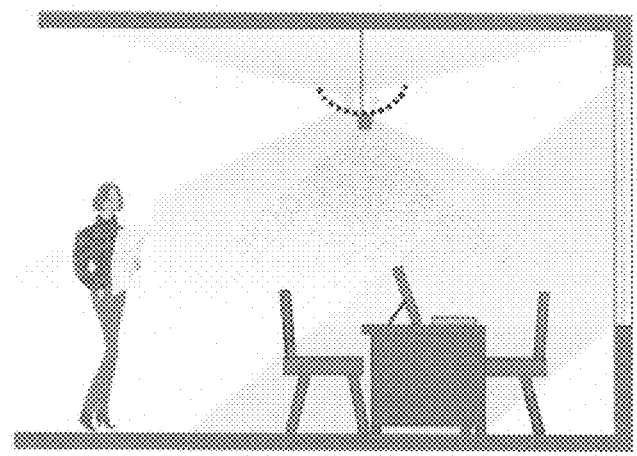
FIG. 3C illustrates the area shown in FIG. 3A when the two lamp light sources controlled by the SDH control system are turned to an intermediate light level due to the presence of an intermediate level of daylight in accordance with an embodiment of the present invention.
Figure 3D:
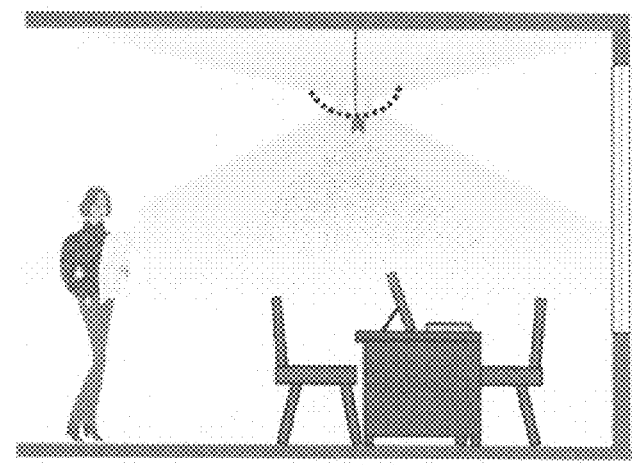
FIG. 3D illustrates the area shown in FIG. 3A when the two lamp light sources controlled by the SDH control system are turned to a high light level due to a lack of daylight in accordance with an embodiment of the present invention.

FIGS. 3B-3D illustrate the area shown in FIG. 3A when the two lamp light sources 302 controlled by the SDH control system are in different states. In FIG. 3B, the two lamp light sources 302 controlled by the SDH control system are turned off when strong daylight is detected by the photosensor 308. In FIG. 3C, a reduced amount of detected daylight causes the SDH control system to turn the two lamp light sources 302 to an intermediate light level. In FIG. 3D, a lack of detected daylight causes the SDH control system to turn the two lamp light sources 302 to a high light level. Note that the different light levels output by the two lamp light sources can be achieved by either an on-off lighting system (shown) or a dimming lighting system.

Note that the components of the SDH system can be configured in a number of possible embodiments. For instance, all of the SDH components may be integrated into a single luminaire and/or light fixture (the terms luminaire, light fixture, and fixture are used interchangeably in the following document). Alternatively, the SDH components may be included in a retrofit kit that is used to integrate SDH functionality into an existing fixture. Another variation integrates SDH components into a bi-level wall switch. The functionality of the SDH system may vary depending on the location and choice of the SDH components. The SDH components for an integrated system can be optimized at the factory so that the angular acceptance, angular sensitivity, and spectral sensitivity of the photosensor match the characteristics of the fixture. Often a photosensor is adjusted to primarily (or only) monitor the area illuminated by an associated luminaire.

In one embodiment of the present invention, the photosensor is located at the bottom-center of a luminaire, and adjusted to include cut-off angles that match the candlepower distribution of the luminaire. In an on-off lighting system, the luminaire may include a single relay for a simple on-off control, and either turn off all light sources when enough daylight is present or instead turn off only some light sources, for instance to show that the luminaire is still functional and/or to provide a baseline of illumination. Alternatively, the luminaire could have multiple relays present so that even a luminaire not specifically wired for multi-level control can still achieve multi-level control for daylight harvesting. Similarly, in a dimming lighting system the luminaire may include the components needed to dim all of the lamps in the luminaire to achieve a range of light levels.

Calibrating a Simplified Daylighting-Harvesting Control System

In one embodiment of the present invention, a system automatically calibrates an SDH control system to provide lighting for an area by adjusting the output of the lighting system to complement daylight and/or other light sources, thereby reducing energy usage. The system can calibrate the SDH control system by using the photosensor to detect signal differences between the multiple states of a multi-level lighting system. The control system automatically measures these differences every time the lights are switched through the light output states, and then uses the measurements to control the output of the lighting system. Such continuous, automatic calibration ensures reliable and regular operation that accounts for lumen depreciation of light sources as well as other factors such as transient changes in furniture layout and reflectance of interior surfaces.

Calibrating an SDH control system can involve identifying a target range of lighting, which can be identified in one or more ways. For instance, a target minimum light level may be defined as a signal measured by a photosensor, or by a set of parameters (e.g., a set of control parameters stored in the controller) adjusted by a user to match a desired level of light. For example, the target level can be defined as a range specified by an on set-point, which indicates the light level at which the light output of the lighting system will be increased, and an off set-point, which indicates the light level at which the light output of the lighting system will be reduced.

In one embodiment of the present invention, a target range of light levels may be defined by an on switch-point and an off switch-point. For instance, a minimum level of light (corresponding to an on switch-point) may be related to the output of the lighting system. The lighting control system may strive to maintain a minimum light level equal to (100% of) the output of the lighting system in isolation at the high energy-level. Alternatively, the control system may strive for a higher light level, for instance 150% or 200% of the output of the electrical lighting system at the high energy-level. For instance, in the latter case, this higher light level may be set as the off switch-point, or the light level that needs to be achieved before any light sources in the lighting system will be turned off.

In one embodiment of the present invention, the lighting control system uses adjustable on/off set-points to switch the light output between multiple states. These set-points can be synchronized through a single controller to ensure that enough separation exists between the two set-points to avoid cycling.

Figure 4:
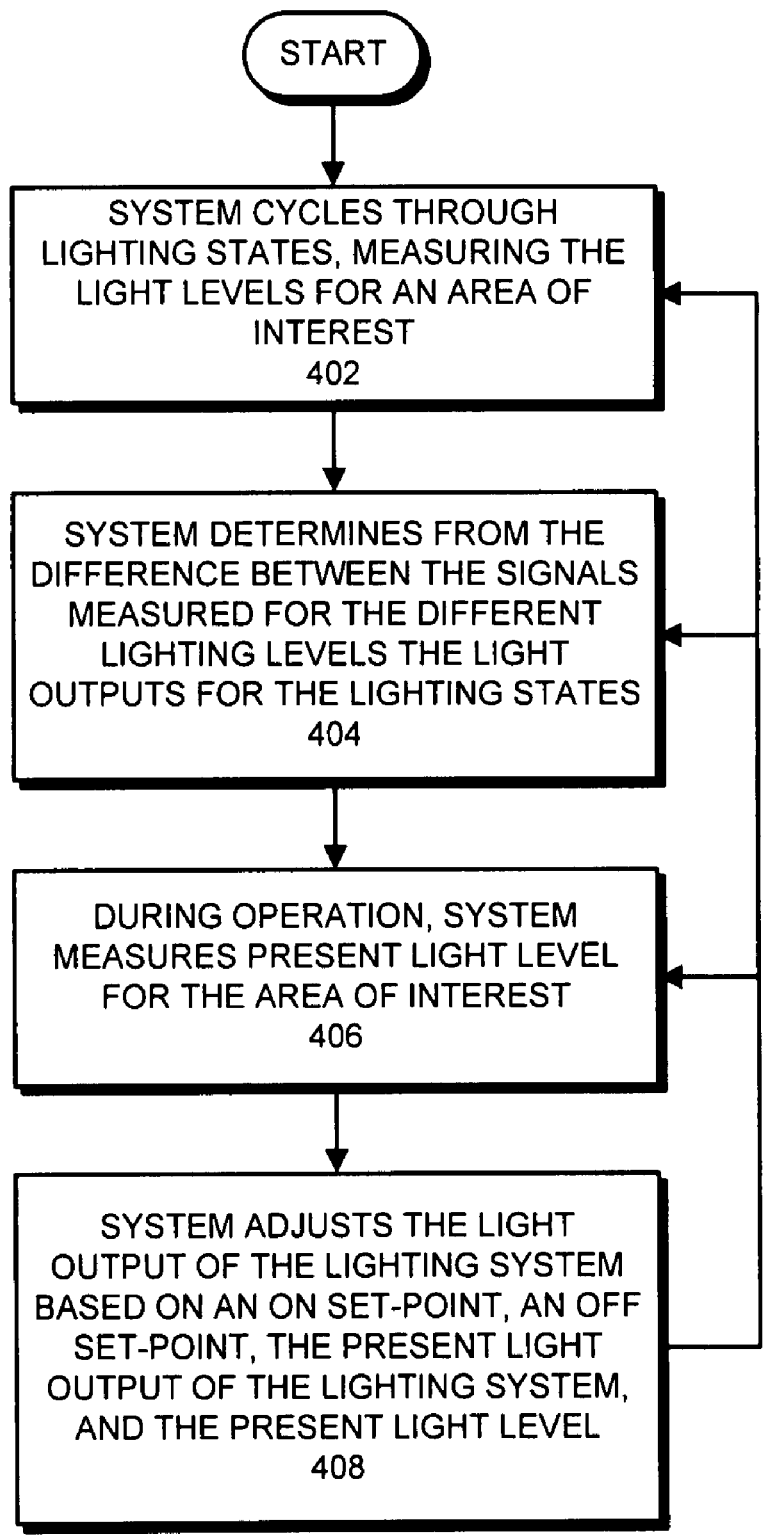
FIG. 4 presents a flow chart illustrating the process of automatically calibrating an SDH control system in accordance with an embodiment of the present invention.

FIG. 4 illustrates the automatic calibration of a SDH control system. First, the control system cycles through its lighting states, measuring the light levels for an area of interest when the lighting system is turned off, when the lighting system is at a high energy-level, and when the lighting system is at an intermediate energy-level (step 402). During this process, the control system uses the difference between the signals measured by the photosensor for the different lighting levels to determine the light outputs for the different states of the lighting system (step 404). For instance, the differences between the signals can be used to specify the main steps for the lighting system, which may be weighted by a controllable multiplier. Then, during operation, the control system measures the present light level for the area of interest (step 406). Finally, the control system adjusts the light output of the lighting system for the area of interest based on an on set-point, and off set-point, the present light output of the lighting system, and the present light level for the area of interest (step 408).

Note that measuring and determining the light outputs for different states of the lighting system may involve allowing the lighting system to reach a steady-state output prior to measuring a given light level. For instance, depending on the type of light source used, a light source may take several minutes to warm-up and achieve a steady-state temperature and/or light output.

The SDH control system can determine the light output of the lighting system by measuring the difference (at the photosensor) between the outputs of the lighting system when it is turned off, at the high energy-level, and at one or more intermediate energy-levels. Note that this operation can occur automatically, thereby allowing the control system to automatically calibrate its light output without any human intervention and eliminating the need for calibration by a technician. Such a lighting system does not need to be shipped with pre-set settings, but can instead automatically calibrate and establish a target set of control parameters after installation.

In one embodiment of the present invention, the SDH control system can determine the light output of the lighting system by measuring the difference (at the photosensor) between the outputs of the lighting system in two states. This technique can be applied to a lighting system with two or more states. For instance, the SDH control system may determine the light output when the lighting system is turned off and at a high energy-level, and then perform calculations to interpolate the probable light output for one or more additional states. Alternatively, the SDH system may only include two states.

In one embodiment of the present invention, the control system performs the calibration described in steps 402-404 in FIG. 4 as an initial calibration during the installation of the lighting system, and then loops between steps 406-408 (as shown by a loop in FIG. 4) during operation. Alternatively, the control system can also continue to periodically measure the light levels for the area, for instance by measuring the difference in light levels whenever the light output of the lighting system is adjusted (either automatically or due to a user input). Measuring the difference in light levels every time the light output of the lighting system is adjusted (as shown by the loops from step 408 to steps 402 and 404 in FIG. 4) allows the control system to continuously calibrate. Continuous calibration allows the lighting control system to account for any changes over time in the characteristics of a light source and/or the surface reflectance in the area of interest.

Figure 5A:
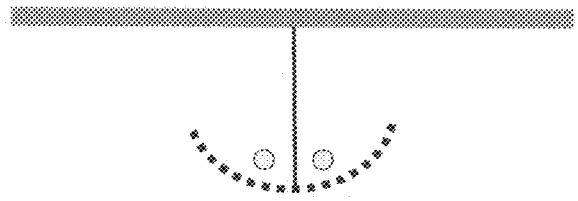
FIG. 5A illustrates a bi-level on-off lighting system in an off state in accordance with an embodiment of the present invention.
Figure 5B:
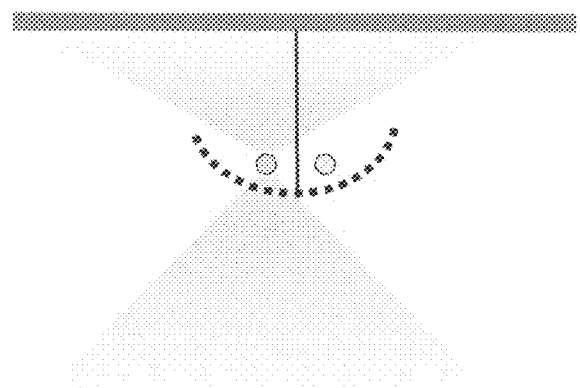
FIG. 5B illustrates a bi-level on-off lighting system in a low light-output state in accordance with an embodiment of the present invention.
Figure 5C:
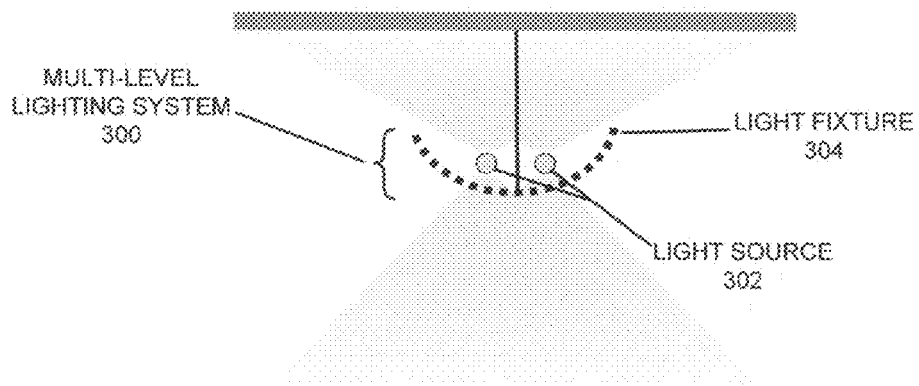
FIG. 5C illustrates a bi-level on-off lighting system in a high light-output state in accordance with an embodiment of the present invention.

FIGS. 5A-5C illustrate a multi-level on-off lighting system 300 that can operate in three states: off (as shown in FIG. 5A); low light-output (one light source on 302, as shown in FIG. 5B); and high light-output (two light sources on 302, as shown in FIG. 5C). The control system for this lighting system activates initial calibration upon the installation of the fixture. First, the control system measures the amount of daylight within the space. Then, the control system switches the light output to the low light-output state (50% light sources on, as shown in FIG. 5B), and measures the additional light signal. Next, the control system switches the light output to the high light-output state (100% light sources on, as shown in FIG. 5C) and measures the additional light signal. Based on the measured light levels, the controller can distinguish the electric light level from the daylight level. For instance, the system can compute that:

100% electric light signal=(100% light sources on+daylight) signal−(daylight) signal.

During calibration, the control system may determine one or more switch points. For instance, the control system may set a switch-off set-point as an adjustable multiplier of the 100% electric light level (e.g. 1.5, to turn some light sources 302 off when the light level in the area exceeds 150% of the electric light level). While the preceding example is described in the context of an on-off lighting system, a similar process can be applied to a multi-level dimming lighting system.

Figure 6:
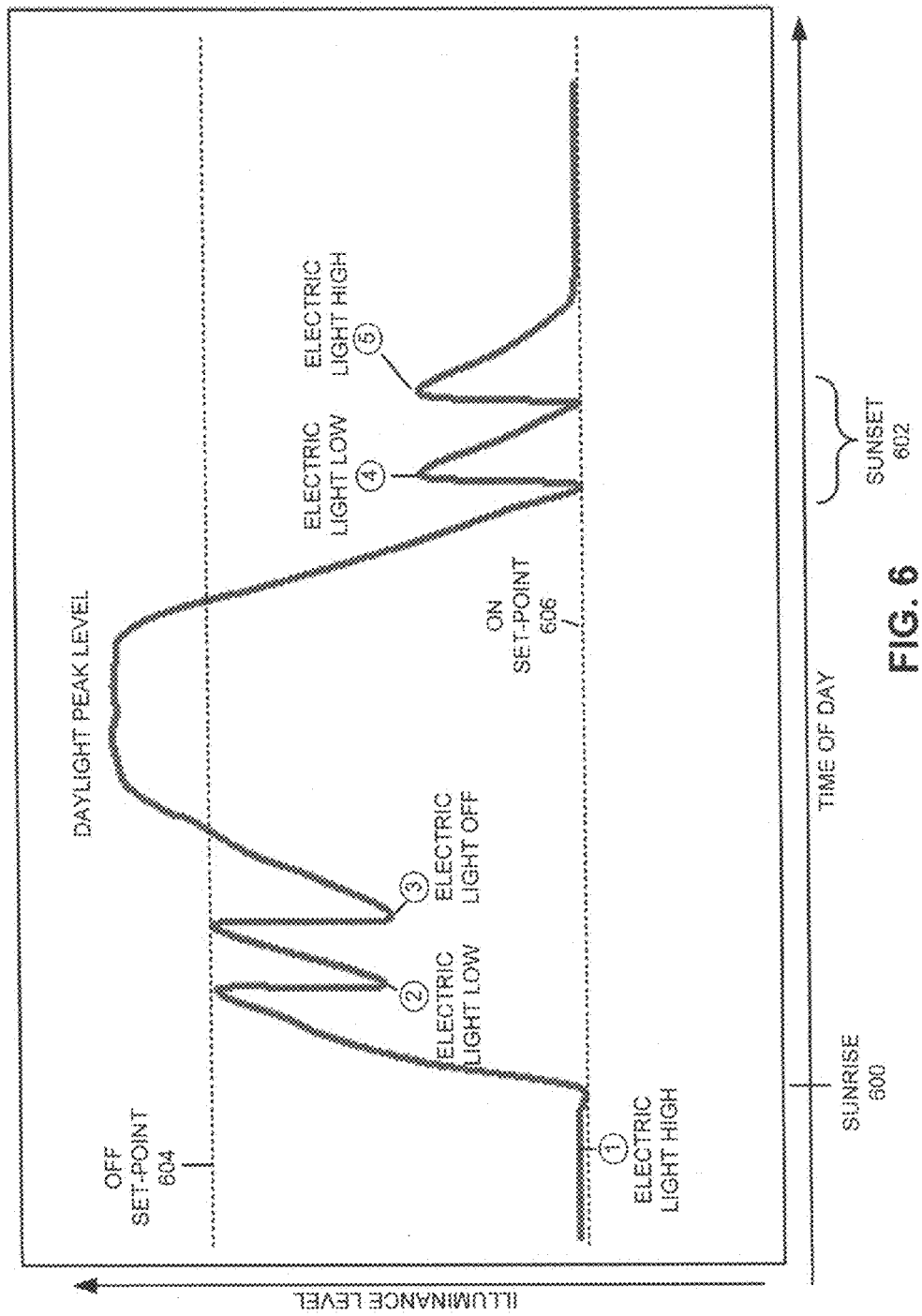
FIG. 6 illustrates an exemplary day of operation for a lighting system in accordance with an embodiment of the present invention.

FIG. 6 illustrates an exemplary day of operation for the lighting system of FIGS. 5A-5C, in which the lighting sources of the lighting system are switched during operation to maintain desired light levels. Before sunrise 600, the electric light system typically is the sole light source, and hence is set to high (point '1' in FIG. 6). After sunrise 600, additional daylight enters the area of interest, until eventually the level of light in the area reaches the level of the off set-point 604. At this time, the control system changes the light output of the lighting system to the lower level (point '2' in FIG. 6). As the daylight increases, the control system again detects that the light level has reached the off set-point 604, and changes the lighting system to the off state (point '3' in FIG. 6). The lights may remain off during the peak daylight hours, until the end of the day approaches. As daylight wanes towards the end of the day, the detected light level in the area of interest drops to the level of the on set-point 606. At this point, the control system turns the lighting system on to the low light-output state (point '4' in FIG. 6). As sunset 602 approaches and the light level continues to drop, the control system again detects that the light level has dropped to the on set-point 606, and eventually sets the light level to the high light-output state (point '5' in FIG. 6).

Note that the control system calibrates automatically across a variety of daylight conditions, including sunny, overcast, foggy, stormy, and rainy weather.

Occupant Acceptance and Occupancy Sensing

Occupant acceptance is an important criterion for the success of automatic lighting control systems. Unless a system's operation matches occupant needs, such lighting systems may be disabled, thereby eliminating energy and peak-demand savings. While commissioning the light system may help bring the system to an acceptable initial state, relying purely on initial calibration typically cannot guarantee that the system will remain calibrated and meet the occupant's specific lighting needs over time.

One important factor for occupant acceptance is the potentially-distracting effect of light changes, for instance when switching on-off lights as compared to an imperceptible dimming function that is timed to slowly ramp light levels up or down. While occupants may be more distracted by dramatic changes in light levels that result from switching (as opposed to a smooth dimming function), switching may only occur twice a day, for instance during early morning and late afternoon or early evening hours. If necessary, occupant acceptance can also be improved (depending on the lighting system type), for instance by: using occupancy-based switching; using multi-level ballasts with ramping functions; and allowing user adjustments.

In one embodiment of the present invention, the control system can introduce a delay into the changing of light levels, to ensure that a change in the measured lighting level of the area is not due to a transient effect. For instance, the entrance of a person wearing dark or bright clothes into the area of interest may change the reflectance, and hence the measured light level, for the area. By introducing a slight delay, the system can provide a "smoothing" effect, perhaps preventing the light level from cycling disruptively if the person enters and leaves the area of interest multiple times in rapid succession.

In one embodiment of the present invention, the system includes a ramping mechanism that gradually changes the light output of the lighting system, thereby minimizing the visual impact of changes to the light output. This ramping system may involve using bi-level ballasts with ramping functions that allow a gradual transition between high and low states. Such bi-level ballasts may provide some of the desired features of dimming ballasts, but at a lower cost.

In one embodiment of the present invention, the control system uses an occupancy sensor to improve the functionality and/or user-acceptance of the SDH system. The control system can use the occupancy sensor to turn off the lighting system when the area of interest is unoccupied, thereby providing substantial energy savings. When users return, the control system can then turn the lights on at a level that is dictated by the photosensor output, either automatically or on occupant demand. The control system can further leverage occupancy tracking to perform potentially disruptive operations when the area is unoccupied. For instance, the control system can delay lighting changes until the area is unoccupied, or perform calibration during periods when no users are present, thereby optimizing lighting output while also preventing users from noticing sudden changes in lighting. In a further embodiment, the control system may only decrease lighting during periods of vacancy, but increase lighting at any time, or vice versa.

User Adjustability

In one embodiment of the present invention, the automatic calibration and operation of the lighting control system can be overridden by an input from a user control. The user control may include one or more of a controller-mounted user control, fixture-mounted user control, a wall-mounted user control, a wireless remote, or some other mechanism for adjusting lighting settings.

In one embodiment of the present invention, the user control allows a user to adjust the lighting parameters and other operations of the lighting control system, including light-adjustments and occupancy-sensing-based options.

For instance, the user may be allowed to:
  specify whether an occupancy sensor should be used to turn off lights when the area is vacant;
  specify whether an occupancy sensor should be used to prevent lighting reductions from occurring when the area is occupied;
  specify that the lighting system should operate automatically, but not turn off completely while the area of interest is occupied;
  adjust either or both of the on/off set-points for the system, using one or more controls; and/or
  manually disable the automatic operation of the control system, and/or rotate between a fixed high light-output, low light-output, and off state.

Note that a range of user control options may be available. For example, a single control may be used to synchronously adjust the interval between the on set-point 606 and off set-point 604 (as shown in FIG. 6). Other related options could include: shifting this interval while maintaining the same illuminance difference between the set-points; allowing the set-points to be set proportionally, for instance in relation to a measured output or other parameter of the lighting control system; or allowing each set-point to be set independently.

In one embodiment of the present invention, the control system tracks user control inputs over time. By tracking such inputs and detecting possible trends, the control system can determine user lighting preferences and adaptively adjust system parameters to improve occupant acceptance and energy savings.

Sensor Variations

In one embodiment of the present invention, a charge-coupled device (CCD) camera can be used as a photosensor and/or as a motion-detecting occupancy sensor. Note that one camera can be considered as an array of photosensors, e.g. as multiple photosensors. The multiple sensing pixels of the CCD can provide fine-tuned daylight and/or occupancy sensing by automatically measuring regions of the camera's field-of-view. Note that some regions of the CCD may be filtered to remove undesirable data. For instance, the control system may consider only a portion of the darkest pixels or average across pixels to filter out non-representative effects such as glare or light from task lamps.

Figure 7:
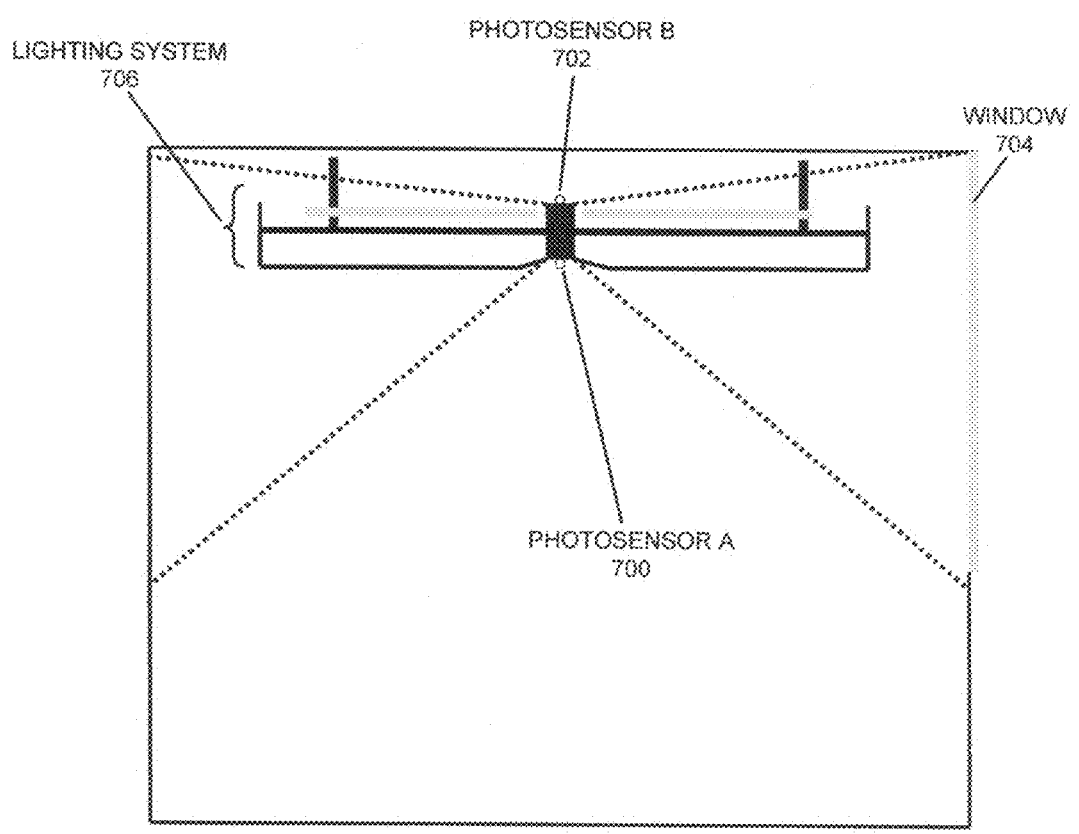
FIG. 7 illustrates a lighting system that includes more than one photosensor in accordance with an embodiment of the present invention.

In one embodiment of the present invention, two or more photosensors can be used to measure the illuminance in an area of interest. FIG. 7 illustrates a lighting system 706 that includes more than one photosensor. In FIG. 7, photosensor A 700 measures the illuminance in a portion of the work area that also receives daylight from a window 704. Meanwhile, photosensor B 702 measures the illuminance in an area that is less likely to be affected by daylight and more likely to be illuminated only by the lighting system 706.

In one embodiment of the present invention, the sensitivity of the photosensor is adjusted to measure customized weights of light levels for an area. For instance, the sensitivity of the photosensor may be reduced for areas directly under the lighting sensor, which are closer in distance to the photosensor than other areas with a different distance and/or angle of incidence. Adjusting the sensitivity of the photosensor allows the control system to measure substantially the same sensitivity from all incoming directions. Techniques that facilitate adjusting the sensitivity of the photosensor and measuring customized weights of light levels for the area can include one or more of the following:
- a baffle that customizes the field-of-view of the photosensor for an application and/or an environment; and
- a filter layer located between the photosensor and an area monitored by the photo sensor.

In summary, daylight levels in areas next to windows typically have enough daylight to eliminate the need for electric lighting for a significant portion of most days of the year. Daylight-harvesting systems can take advantage of this daylight to provide significant energy savings, but are typically associated with a high commissioning cost and calibration issues. One embodiment of the present invention provides a simple, robust technique for automatically and continuously calibrating daylight-harvesting control systems. Such calibration can be used to improve the functionality and to lower the cost of daylight-harvesting systems in commercial, residential, and other environments.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for continuously calibrating a lighting system that facilitates daylight-harvesting, which involves combining the output of the lighting system with daylight and/or other light sources to reduce energy usage while providing lighting for an area, where the lighting system includes multi-level lighting capabilities for one or more light sources, the method comprising:
   determining a target light level for the area;
   performing the following operations:
   (a) measuring the light levels for the area when the lighting system is turned on at a high energy-level, is turned on at an intermediate energy-level, and is turned off;
   (b) determining from the measured light levels the light output of the lighting system for the different energy-levels;
   (c) measuring a present light level for the area; and
   (d) adjusting the light output of the lighting system based on the target light level, a lighting control parameter, the light output of the lighting system, and the present light level for the area;
   wherein determining a target light level for the area involves determining a minimum amount of light for the area based on the measured light levels output by the lighting system;
   repeating operations (a)-(d) during operation of the lighting system to ensure that the area receives the minimum amount of light over time without human intervention.

2. The method of claim 1, wherein the lighting system includes one or more of the following:
   one or more light sources;
   a photosensor;
   a controller, which can include both logic and switching functionality;
   a user control; and
   an occupancy sensor;
   wherein the photosensor measures light levels for the area; and
   wherein the controller adjusts the lighting system output through one or more steps from a high state to a low state based on input from the photosensor.

3. The method of claim 2, wherein the target light level for the area is related to the output of the lighting system at the high energy-level.

4. The method of claim 1, wherein measuring the light levels involves allowing the lighting system to reach a steady state prior to measuring a given light level.

5. The method of claim 2, wherein determining the light output of the lighting system involves:
   measuring the difference between the output of the photosensor when the lighting system is at the high energy-level, is at the intermediate energy-level; and is turned off; and
   using the differences between the measured light levels to determine the light output of the lighting system and to automatically calibrate the control of the light output of the lighting system without human intervention.

6. The method of claim 2, where the method further involves:
   measuring the light levels for the area frequently; and
   measuring the difference in light levels whenever the light output of the lighting system is adjusted;
   wherein measuring the difference in light levels every time the light output of the lighting system is adjusted allows the system to continuously calibrate; and
   wherein calibrating the lighting system accounts for changes in a light source and/or changes in the reflectance of surfaces in the area.

7. The method of claim 2, wherein the method further involves:
   receiving a user input via the user control; and
   adjusting the lighting control parameter and/or the light level for the area based on the user input.

8. The method of claim 7, where the lighting control parameter involves:
   an off set-point, wherein the off set-point indicates the light level at which the light output of the lighting system will be reduced; and/or
   an on set-point, wherein the on set-point indicates the light level at which the light output of the lighting system will be increased.

9. The method of claim 8, wherein adjusting the lighting control parameter based on the user input involves:
   changing the off set-point based on the user input; and/or
   changing the on set-point based on the user input.

10. The method of claim 2, wherein the user control includes one or more of the following:
    a controller-mounted user control;
    a fixture-mounted user control;
    a wall-mounted user control; and
    a wireless remote.

11. The method of claim 6, wherein the automatic calibration and operation of the lighting system can be overridden by an input from the user control.

12. The method of claim 1, wherein adjusting the light output of the lighting system to maintain the target light level for the area involves using a ramping mechanism that gradually changes the light output of the lighting system to minimize the visual impact of the changes to the light output.

13. The method of claim 1,
wherein adjusting the light output of the lighting system involves adding a time delay; and
wherein the time delay ensures that changes in measured light levels are not due to a transient effect.

14. The method of claim 7, wherein the occupancy sensor is used to achieve one or more of the following:
turn off a lighting source when the area is not occupied;
ensure that a lighting source is never turned off when the area is occupied;
ensure that the light output of the lighting system is not reduced only when the area is occupied;
detect when the area is not occupied, so that that lighting system can calibrate when no occupants are present; and/or
detect when the area is re-occupied, at which point the system can determine a level of light output based on the output of the photosensor.

15. The method of claim 2, wherein one or more components of the lighting system are integrated into a lighting fixture.

16. The method of claim 1,
wherein the lighting system is an on-off lighting system; and
wherein an on-off lighting system includes multiple lighting sources that can be turned on and off independently to adjust light output and energy usage.

17. The method of claim 1, wherein the lighting system is a dimming lighting system.

18. The method of claim of claim 14,
wherein the user control can be used to override the normal operation of the lighting system; and
wherein overriding the lighting system can involve setting the light output of the lighting system to a high energy-level and ignoring the input to the photosensor and/or the occupancy sensor.

19. The method of claim 1, where in the lighting system includes two or more light sources.

20. An apparatus that continuously calibrates a lighting system to facilitate daylight-harvesting, which involves combining the output of the lighting system with daylight and/or other light sources to reduce energy usage while providing a lighting for an area, where the lighting system includes multi-level lighting capabilities for one or more light sources, comprising:
a determining mechanism configured to determine a target light level for the area, wherein determining a target light level for the area involves determining a minimum amount of light for the area based on the measured light levels output by the lighting system;
a measurement mechanism configured to measure the light levels for the area when the lighting system is at a high energy-level, is at an intermediate energy-level, and is turned off;
wherein the determining mechanism is further configured to determine from the measured light levels the light output of the lighting system for the different energy-levels;
wherein the measurement mechanism is further configured to measure a present light level for the area; and
an adjustment mechanism configured to adjust the light output of the lighting system based on the target light level, a lighting control parameter, the light output of the lighting system, and the present light level for the area;
wherein the measurement mechanism, the determining mechanism, and the adjustment mechanism are configured to repeat some or all of their operations during operation of the lighting system to ensure that the area receives the minimum amount of light over time without human intervention.

* * * * *